A. C. SIMONIS.
SELF FEEDER PLANTER SACK.
APPLICATION FILED JULY 16, 1908.

913,988.

Patented Mar. 2, 1909.

Inventor
A. C. Simonis.

UNITED STATES PATENT OFFICE.

ARTHUR C. SIMONIS, OF AMHERST JUNCTION, WISCONSIN.

SELF-FEEDER PLANTER-SACK.

No. 913,988.          Specification of Letters Patent.          Patented March 2, 1909.

Application filed July 16, 1908. Serial No. 443,879.

*To all whom it may concern:*

Be it known that I, ARTHUR C. SIMONIS, citizen of the United States, residing at Amherst Junction, in the county of Portage and State of Wisconsin, have invented certain new and useful Improvements in Self-Feeder Planter-Sacks, of which the following is a specification.

This invention comprehends certain new and useful improvements in planting devices of the manually operated type, and the object of the invention is an improved planter sack which may be readily carried by a farm hand engaged in seed planting, and is designed to receive the seed to permit the same to be conveniently carried from place to place and automatically discharged as it is required in the planting operation, by means of which the flow of the seed may be positively controlled by the operator or entirely cut off when the device is not in use, and which is susceptible of being used by both right- and left-handed persons, and renders a person equipped therewith capable of accomplishing the planting with unusual facility and in a minimum amount of time.

With this and other objects in view that will more fully appear as the description proceeds, the invention consists in certain constructions and arrangements of the parts that I shall hereinafter fully describe and then point out the novel features thereof in the appended claim.

Figure 1:
Figure 2:
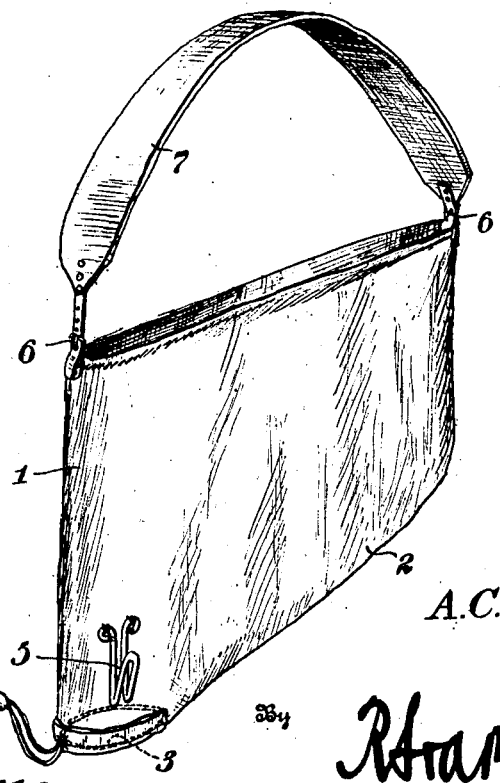

For a full understanding of the invention and the merits thereof, and to acquire a knowledge of the details of construction, reference is to be had to the following description and accompanying drawing, in which:

Figure 1 is a view illustrating the use of my improved planter sack, and, Fig. 2 is a perspective view thereof.

Corresponding and like parts are referred to in the following description and indicated in all the views of the drawing, by the same reference characters.

Referring to the drawing, the numeral 1 designates my improved sack which, in the present instance, is made of canvas, although it is to be understood that any desired or suitable material may be used, and which is open at its upper end, as shown, and is arranged to constitute a hopper that is arranged to receive and contain the seed until it is desired for use. In order to automatically discharge or feed the seed from the sack, the bottom of the latter slopes downwardly toward one side edge, as indicated at 2, and is formed in its lowermost portion with an opening 3 extending therethrough to constitute an escape or outlet for the seed, such opening being adapted to be closed by any suitable means, as by a draw-string 4 arranged for engagement with a hook 5 that is secured to the sack near the opening. The sack is provided at its upper end near its opposite edges with buckles 6 that are arranged for adjustable engagement with the ends of the shoulder strap 7 to connect the latter to the sack and thus render the sack capable of being conveniently carried from place to place.

In the practical use of my improved planter sack, the shoulder strap 7 is passed over the right shoulder of the farm hand or other person using the device, so as to suspend the sack at the left side of the operator with the lowermost portion of the bottom having the escape opening, toward the front. The draw-string 4 is then disengaged from the hook to permit the outlet opening to expand, and the left hand of the operator is closed over such opening and is arranged in conjunction with the draw-string to control the passage of the seed through the outlet, the seed feeding toward the lowermost part of the bottom of the sack because of the sloping formation thereof and passing through the escape opening so as to drop into the outstretched right hand of the operator, as it is required in the planting operation. If desirable, the operator may carry a hand planter in his right hand, and the seed may be dropped therein as required.

From the above description, in connection with the accompanying drawing, it will be apparent that I have provided an improved planter sack which is most efficient in operation, since the desired quantity of seed may be automatically fed or discharged therefrom, which embodies lightness, simplicity and durability of construction, and which may be easily and cheaply manufactured so as to be placed upon the market at a price not too great to prevent its general adoption.

Having thus described the invention, what I claim is:

In a device of the character described, the combination of a sack 1 open at its upper end and having its bottom 2 disposed obliquely to the side edges of the sack and sloping downwardly toward one of such edges and formed in proximity to the same with an outlet opening 3, the material forming the sack being hemmed around the outlet opening, a draw string 4 mounted in the hem and adapted to contract the opening to effect the closure thereof, a hook 5 secured to the sack in proximity to the opening and arranged for engagement by the draw string, and suspension means secured to the upper end of the sack, as and for the purpose specified.

In testimony whereof I affix my signature in presence of two witnesses.

ARTHUR C. SIMONIS. [L. S.]

Witnesses:
    WILLIAM T. WALLER,
    CARL J. LOBERG.